US012337236B2

(12) United States Patent
Shen

(10) Patent No.: US 12,337,236 B2
(45) Date of Patent: *Jun. 24, 2025

(54) VIRTUAL-ENVIRONMENT-BASED OBJECT CONSTRUCTION METHOD AND APPARATUS, COMPUTER DEVICE, AND COMPUTER-READABLE STORAGE MEDIUM

(71) Applicant: Tencent Technology (Shenzhen) Company Limited, Shenzhen (CN)

(72) Inventor: Chao Shen, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/763,530

(22) Filed: Jul. 3, 2024

(65) Prior Publication Data

US 2024/0359095 A1 Oct. 31, 2024

Related U.S. Application Data

(63) Continuation of application No. 17/345,366, filed on Jun. 11, 2021, now Pat. No. 12,059,615, which is a
(Continued)

(30) Foreign Application Priority Data

Apr. 25, 2019 (CN) .......................... 201910340401.4

(51) Int. Cl.
*A63F 13/52* (2014.01)
*G06T 7/55* (2017.01)
(Continued)

(52) U.S. Cl.
CPC .............. *A63F 13/52* (2014.09); *G06T 7/55* (2017.01); *G06T 7/74* (2017.01); *G06T 7/90* (2017.01);
(Continued)

(58) Field of Classification Search
None
See application file for complete search history.

(56) References Cited

U.S. PATENT DOCUMENTS 9,779,479 B1  10/2017  Makinen et al.
2014/0375629 A1*  12/2014  Samson ................. A43D 1/025
345/419
(Continued)

FOREIGN PATENT DOCUMENTS

CN  103971404 A  8/2014
CN  108122275 A  6/2018
(Continued)

OTHER PUBLICATIONS

Extended European Search Report for European Patent Application No. 20794587.4 dated Jun. 13, 2022 (8 pages).
(Continued)

*Primary Examiner* — Jason T Yen
(74) *Attorney, Agent, or Firm* — Crowell & Moring LLP

(57) ABSTRACT

A virtual-environment-based object construction method and apparatus, and a computer-readable storage medium are disclosed in this disclosure, relating to the field of virtual environment. Performed by a terminal comprising a camera, the method including: displaying an environment interface; receiving a capture operation being used for acquiring three-dimensional (3D) information of a to-be-acquired object; receiving a position input operation for determining a display position of the target object in the virtual environment; and displaying the target object at the display position in the virtual environment according to the capture operation and the position input operation.

20 Claims, 10 Drawing Sheets

Related U.S. Application Data continuation of application No. PCT/CN2020/074910, filed on Feb. 12, 2020.

(51) Int. Cl.
  *G06T 7/73* (2017.01)
  *G06T 7/90* (2017.01)
  *G06T 19/20* (2011.01)

(52) U.S. Cl.
  CPC .......... *G06T 19/20* (2013.01); *G06T 2200/24* (2013.01); *G06T 2207/10016* (2013.01); *G06T 2207/10028* (2013.01); *G06T 2207/30244* (2013.01); *G06T 2210/12* (2013.01); *G06T 2210/56* (2013.01); *G06T 2219/2008* (2013.01); *G06T 2219/2012* (2013.01); *G06T 2219/2024* (2013.01)

(56) References Cited

U.S. PATENT DOCUMENTS

| | | | |
|---|---|---|---|
| 2016/0247017 | A1 | 8/2016 | Sareen et al. |
| 2016/0284123 | A1* | 9/2016 | Hare .................. G06T 7/55 |
| 2018/0264365 | A1* | 9/2018 | Soederberg .......... A63F 13/655 |
| 2019/0089942 | A1* | 3/2019 | Hanamoto ........... H04N 13/275 |
| 2019/0240580 | A1* | 8/2019 | Walker ................. A63F 13/65 |

FOREIGN PATENT DOCUMENTS

| | | |
|---|---|---|
| CN | 108136257 A | 6/2018 |
| CN | 108537876 A | 9/2018 |
| CN | 108550181 A | 9/2018 |
| CN | 108694741 A | 10/2018 |
| CN | 109410316 A | 3/2019 |
| CN | 109525831 A | 3/2019 |
| CN | 109641150 A | 4/2019 |
| CN | 110064200 A | 7/2019 |
| WO | WO 2018/148924 A1 | 8/2018 |
| WO | WO 2018/203029 A1 | 11/2018 |

OTHER PUBLICATIONS

International Search Report and Written Opinion with English tranlation for International Application No. PCT/CN2020/074910 mailed May 11, 2020 (13 pages).

Office Action with English Translation of Concise Explanation of Relevance for Chinese Patent Application No. 201910340401.4 dated Feb. 24, 2021 (15 pages).

Mo, E.; Minecraft My World, [My World 0.15 Surrounding] Pixel Image Generator, online video from 00:00 to 08:36 https://www.igiyi.com/w_19ruc9dgwh.html dated Jan. 20, 2017.

* cited by examiner

VIRTUAL-ENVIRONMENT-BASED OBJECT CONSTRUCTION METHOD AND APPARATUS, COMPUTER DEVICE, AND COMPUTER-READABLE STORAGE MEDIUM

RELATED APPLICATION

This application is a continuation of U.S. Non-Provisional application Ser. No. 17/345,366, filed Jun. 11, 2021, which is a continuation application of the International PCT Application No. PCT/CN2020/074910, filed with the China National Intellectual Property Administration, PRC on Feb. 12, 2020, which claims priority to Chinese Patent Application No. 201910340401.4, filed with the China National Intellectual Property Administration, PRC on Apr. 25, 2019. The contents of U.S. Non-Provisional application Ser. No. 17/345,366, International PCT Application No. PCT/CN2020/074910, and Chinese Patent Application No. 201910340401.4 are each incorporated herein by reference in their entireties.

FIELD OF THE TECHNOLOGY

Embodiments of this disclosure relate to the field of virtual environment, and in particular, to a virtual-environment-based object construction method and apparatus, a computer device, and a computer-readable storage medium.

BACKGROUND OF THE APPLICATION

A sandbox game is a game mode in which a player uses voxel blocks provided in the game to create an original object and interacts with the original object. Voxel blocks provided in the sandbox game may be voxel blocks classified by material, or voxel blocks classified by color. For example, the sandbox game provides coal voxel blocks, diamond voxel blocks, brick voxel blocks, and the like; or red voxel blocks, green voxel blocks, purple voxel blocks, and the like.

Generally, the player uses voxel blocks classified by color to construct colorful objects such as a decorative object and a billboard in a sandbox game environment. Taking the construction of a decorative object as an example, the player first determines an overall style of the decorative object to be built, then stacks voxel blocks of different colors at corresponding positions of the style according to the overall style, and obtains the decorative object after stacking.

SUMMARY

According to embodiments of this disclosure, a virtual-environment-based object construction method and apparatus, a computer device, and a computer-readable storage medium are provided.

A virtual-environment-based object construction method is provided, applicable to a terminal provided with a camera, the method including:

displaying an environment interface, the environment interface including an image corresponding to a virtual environment;

receiving a capture operation, the capture operation being used for acquiring three-dimensional (3D) information of a to-be-acquired object by using the camera to obtain a feature point cloud of the to-be-acquired object, the feature point cloud being used for determining a style of a to-be-constructed target object;

receiving a position input operation, the position input operation being used for determining a display position of the target object in the virtual environment; and displaying the target object at the display position in the virtual environment according to the capture operation and the position input operation, the target object being obtained by filling a region corresponding to the feature point cloud with voxel blocks.

A virtual-environment-based object construction apparatus is provided, applicable to a terminal provided with a camera, the apparatus including:

a display module, configured to display an environment interface, the environment interface including an image corresponding to a virtual environment; and a receiving module, configured to receive a capture operation, the capture operation being used for acquiring three-dimensional (3D) information of a to-be-acquired object by using the camera to obtain a feature point cloud of the to-be-acquired object, the feature point cloud being used for determining a style of a to-be-constructed target object;

the receiving module being further configured to receive a position input operation, the position input operation being used for determining a display position of the target object in the virtual environment; and the display module being further configured to display the target object at the display position in the virtual environment according to the capture operation and the position input operation, the target object being obtained by filling a region corresponding to the feature point cloud with voxel blocks.

A computer device, including a processor and a memory. The memory stores at least one instruction, at least one program, a code set or an instruction set, the at least one instruction, the at least one program, the code set or the instruction set being loaded and executed by the processor to implement the virtual-environment-based object construction method according to the embodiments of this disclosure.

A computer-readable storage medium, storing at least one instruction, at least one program, a code set or an instruction set, the at least one instruction, the at least one program, the code set or the instruction set being loaded and executed by the processor to implement the virtual-environment-based object construction method according to the embodiments of this disclosure.

A computer program product is provided, the computer program product, when running on a computer, causing the computer to perform the virtual-environment-based object construction method according to the embodiments of this disclosure.

Details of one or more embodiments of this disclosure are provided in the drawings and descriptions below. Other features and advantages of this application become obvious with reference to the specification, the accompanying drawings, and the claims.

BRIEF DESCRIPTION OF THE DRAWINGS

To describe the technical solutions in the embodiments of this disclosure more clearly, the following briefly introduces the accompanying drawings required for describing the embodiments. Apparently, the accompanying drawings in the following description show only some embodiments of this disclosure, and a person of ordinary skill in the art may still derive other accompanying drawings from these accompanying drawings without creative efforts.

DESCRIPTION OF EMBODIMENTS

To make objectives, technical solutions, and advantages of this application clearer, the following further describes implementations of this application in detail with reference to the accompanying drawings. It is to be understood that the specific embodiments described herein are merely used to explain this application but are not intended to limit this application.

First, terms involved in the embodiments of this disclosure are briefly introduced:

Sandbox game: a game or a game mode in which a player uses voxel blocks provided in the game to create an original object and interacts with the original object. The sandbox game may include a game application that constructs a virtual object in a virtual environment with voxel blocks. Generally, the sandbox game is highly interactive and offers a high degree of freedom to the player, who can creatively construct and stack voxel blocks in the virtual environment of the game. In some implementations, no main storyline is set in the sandbox game usually, and the player walks freely in the virtual environment of the game without completing corresponding tasks according to the development of the storyline.

Figure 1:
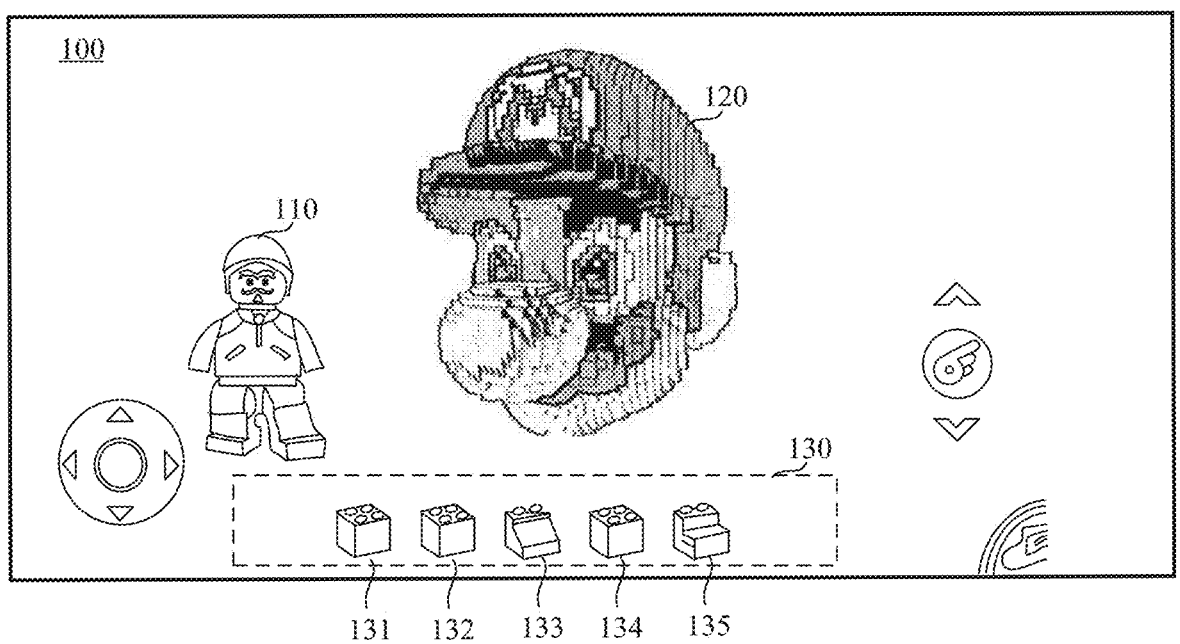
FIG. 1 is a schematic diagram of a virtual environment and voxel blocks of a sandbox game according to an exemplary embodiment of this disclosure.

Voxel block: a material block provided in a sandbox game for constructing a virtual object in a virtual environment. In some implementations, voxel blocks may be classified by the material type, by color, or by both the material type and color. The three situations are separately illustrated as follows. 1. a sandbox game provides coal voxel blocks, diamond voxel blocks, brick voxel blocks, and the like; 2. a sandbox game provides red voxel blocks, green voxel blocks, purple voxel blocks, and the like; 3. a sandbox game provides red bricks, green bricks, purple bricks, and the like. In some implementations, voxel blocks classified by the material type can be processed into materials for a building, furniture, and other articles. For example, glass obtained by smelting sand voxel blocks can be used as a window of a building. In some implementations, objects with rich colors such as decorative objects and billboards may be constructed by using voxel blocks classified by color. In some implementations, the size of voxel blocks can be fixed. For voxel blocks classified by the material type, the size of the voxel blocks can be determined according to different material types. For voxel blocks classified by color, voxel blocks of different color may have the same size, and each color corresponds to voxel blocks of a plurality of sizes, for example, small-sized white voxel blocks, medium-sized white voxel blocks, and large-sized white voxel blocks. In some implementations, the shapes of voxel blocks may be uniform, such as a cuboid or a cube, or may be in a plurality of styles. As shown in FIG. 1, an environment interface 100 illustrates an image corresponding to a virtual environment. The virtual environment includes a virtual character 110 and an object 120 built by a player. The object 120 is built by using voxel blocks in a voxel library. Shapes of some voxel blocks in the voxel library are shown in a voxel block display region 130. The voxel block display region 130 includes a green square voxel block 131, a brown square voxel block 132, a brown triangular voxel block 133, a black square voxel block 134, and a gray step voxel block 135, and the voxel blocks are displayed in the shapes of Lego blocks.

In some implementations, the voxel blocks may be obtained by the player in a virtual environment, or provided by the application. For example, mineral object blocks, such as the coal voxel blocks, diamond voxel blocks, and the like need to be obtained by the player through mining in a virtual environment, while ordinary voxel blocks classified by color are provided by the game.

Feature point cloud: a contour of a to-be-acquired object expressed in the form of a point cloud generated according to three-dimensional (3D) information of the to-be-acquired object. In some implementations, the feature point cloud is generated based on depth information obtained after the to-be-acquired object is captured by a depth camera.

Application scenarios of the virtual-environment-based object construction method provided in the embodiments of this disclosure are described. The application scenarios of the virtual-environment-based object construction method provided in this application include at least the following application scenarios:

When constructing a target object in a sandbox game, a player captures a to-be-acquired object in the sandbox game by using a camera of a terminal, and generates a feature point cloud corresponding to the to-be-acquired object according to 3D information of the to-be-acquired object. Then corresponding voxel blocks are automatically filled in a region corresponding to the feature point cloud according to the feature point cloud, and the target object corresponding to the to-be-acquired object is generated and displayed at a display position.

In the foregoing example, the sandbox game is used merely as an example for description. The method is further applicable to any application that provides a virtual environment and voxel blocks, which is not limited in the embodiments of this disclosure.

Figure 2:
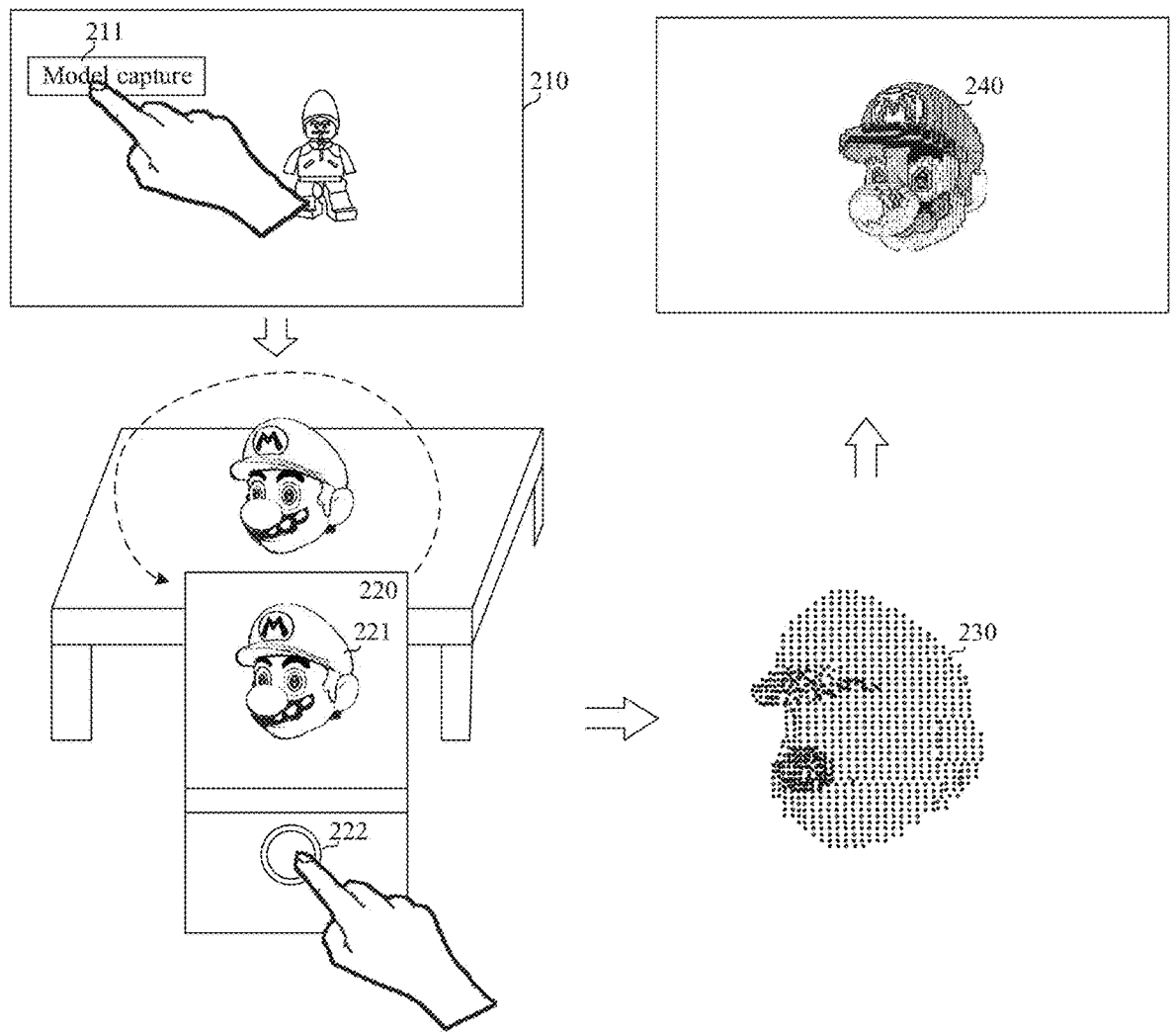
FIG. 2 is an overall schematic flowchart of a virtual-environment-based object construction method according to an exemplary embodiment of this disclosure.

For example, referring to FIG. 2, an environment interface 210 of the sandbox game includes a capture function control 211. After a user makes a selection on the capture function control 211, a capture interface 220 is displayed, and the capture interface 220 includes an image displayed during image acquisition by using the camera of the terminal, as shown in FIG. 2. The capture interface 220 includes a to-be-acquired object 221. After the user long-presses a capture control 222 of the capture interface 220, and holds the terminal to continuously capture around the to-be-acquired object 221, a feature point cloud 230 corresponding to the to-be-acquired object 221 is generated. Then voxel block filling is performed according to the feature point cloud 230 to generate a target object 240, and the target object 240 is displayed according to a display position of the target object 240 in the virtual environment.

Figure 3:
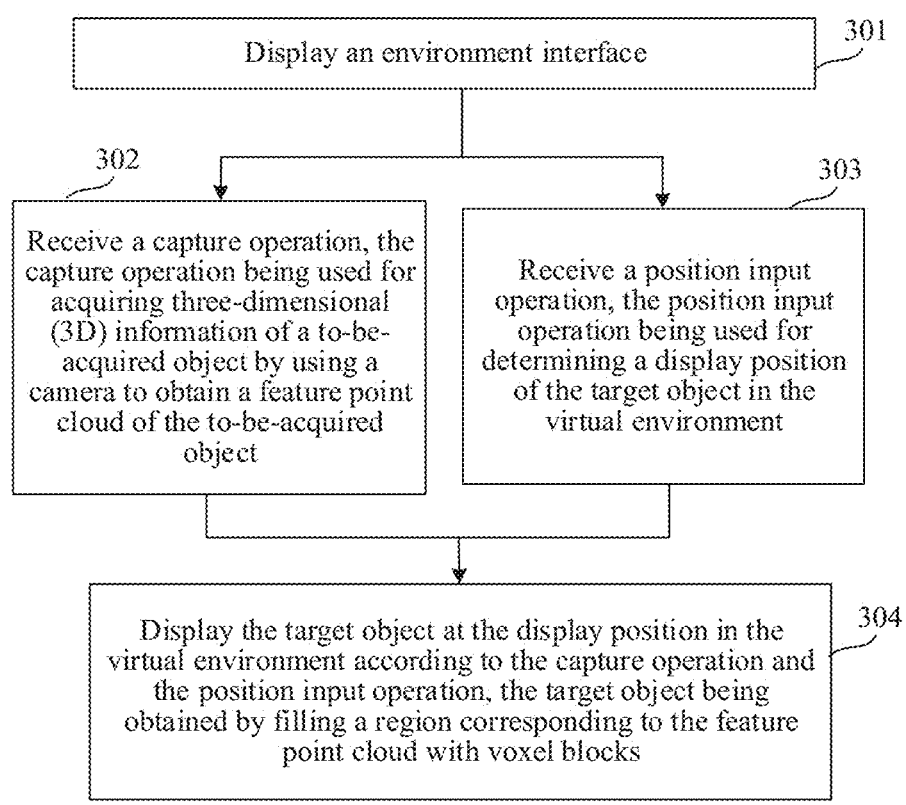
FIG. 3 is a flowchart of a virtual-environment-based object construction method according to an exemplary embodiment of this disclosure.

With reference to the term introductions and application scenarios, the virtual-environment-based object construction method provided in an embodiment of this disclosure is described. FIG. 3 is a flowchart of a virtual-environment-based object construction method according to an exemplary embodiment of this disclosure. The method being applied to a terminal provided with a camera is used as an example for description. As shown in FIG. 3, the method includes the following steps:

Step 301: Display an environment interface.

The environment interface may include an image corresponding to a virtual environment.

In some implementations, the method is applicable to a sandbox game. The sandbox game provides a virtual environment, and the virtual environment includes a virtual entity. The player can control the virtual entity to move in the virtual environment, construct voxel blocks, or perform other operations. In some implementations, currently available voxel blocks are also displayed in the environment interface.

Step 302: Receive a capture operation, the capture operation being used for acquiring 3D information of a to-be-acquired object by using a camera to obtain a feature point cloud of the to-be-acquired object.

In some implementations, the feature point cloud is used for determining a style of a to-be-constructed target object. The style of the target object may include at least one of a contour, a structure, or color composition of the target object, where the contour of the target object is used for representing the form of appearance of the target object, and the structure of the target object is used for representing a construction structure of the target object, for example, a hollow structure or a solid structure, and the color composition of the target object is used for representing colors of voxel blocks for constructing the target object.

In some implementations, receiving the capture operation may be implemented by receiving a capture operation for n frames of images around the to-be-acquired object, and n is a positive integer. The n frames of images include images captured around the to-be-acquired object. For example, the n frames of images include images captured in front of, on the left of, on the right of, behind, and above the to-be-acquired object. The n frames of images may be n frames of images in a video stream, or n frames of images captured at fixed points around the object to-be-acquired object, that is, methods for acquiring the n frames of images include:

In the first method, a video capture operation around the to-be-acquired object is received, a video stream captured by the video capture operation including the n frames of images.

In some implementations, images are continuously acquired by the camera according to the video capture operation. The camera may perform capturing around the to-be-acquired object. For example, the user rotates the camera clockwise around the to-be-acquired object from the front of the to-be-acquired object for one cycle, and then to the top of the to-be-acquired object. If the camera is not rotated under the to-be-acquired object, for example, the to-be-acquired object is placed on a desktop and cannot be captured from below, the uncaptured part corresponding to the target object may be implemented as a plane. That is, the bottom of the target object may be implemented as a plane.

In the second method, a fixed-point capture operation around to-be-acquired object is received, the fixed-point capture operation being used for capturing the n frames of images at designated positions around the to-be-acquired object.

Figure 4:
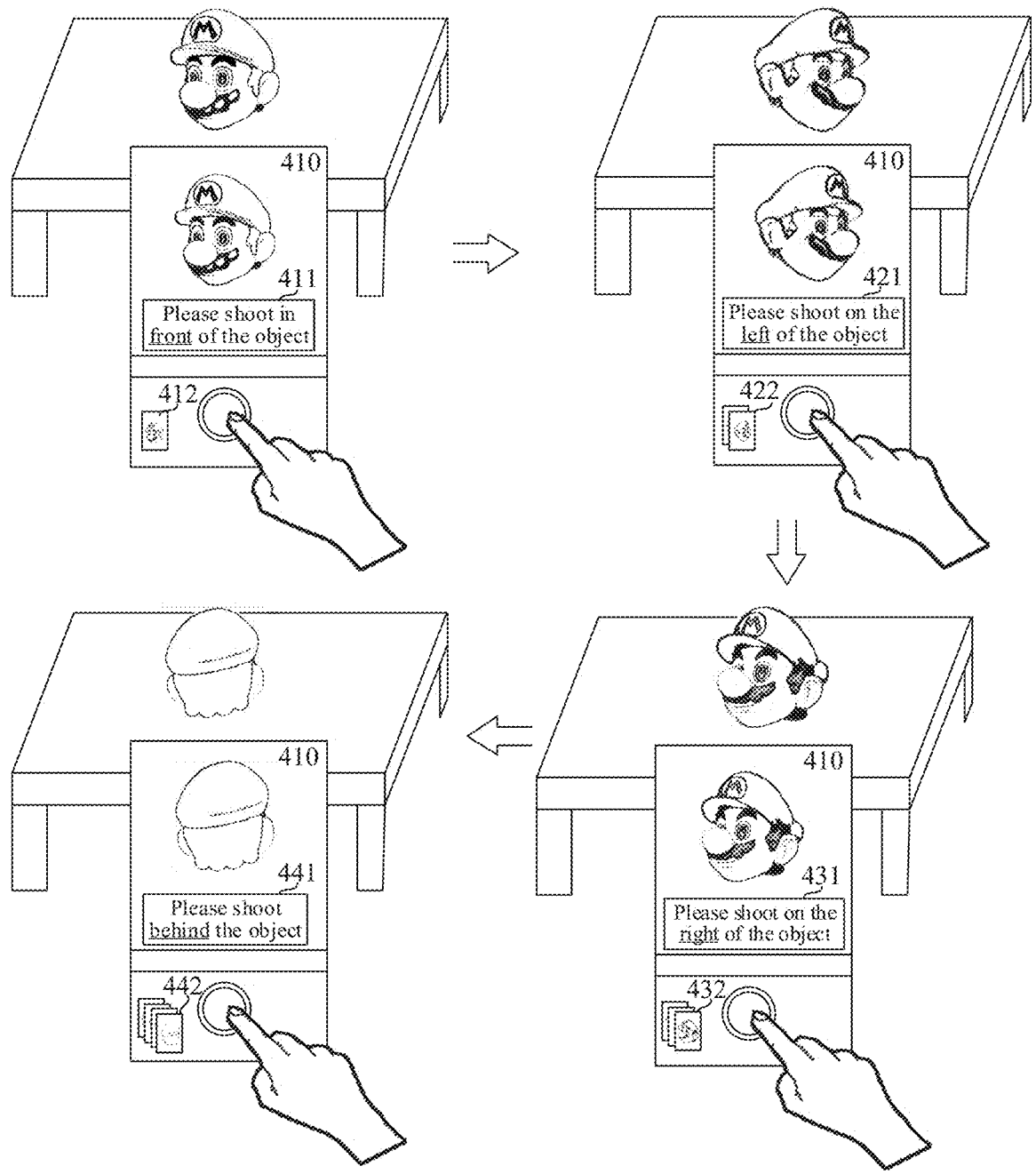
FIG. 4 is a schematic diagram of an interface of a method for capturing a to-be-acquired object according to an embodiment shown in FIG. 3.

In some implementations, the designated position may be a position determined according to a prompt of the terminal during the capture process. As shown in FIG. 4, after a capture interface 410 is activated, a prompt message bar 411 "Please shoot in front of the object" is displayed in the capture interface 410; when the capture operation is received and a first frame of image 412 is obtained, a prompt message bar 421 "Please shoot on the left of the object" is displayed in the capture interface 410; when the capture operation is received and a second frame of image 422 is obtained, a prompt message bar 431 "Please shoot on the right of the object" is displayed in the capture interface 410; when the capture operation is received and a third frame of image 432 is obtained, a prompt message bar 441 "Please shoot behind the object" is displayed in the capture interface 410; and after the capture operation is received, a fourth frame of image 442 is obtained, where the capture operations in front of, on the left of, on the right of, and behind the object are fixed-point capture operations around the object. In FIG. 4, four frames of images are used as examples for illustration. In actual operation, more or fewer images may be obtained by the fixed-point capture operation.

In some implementations, according to the capture capability of the camera of the terminal, the feature point cloud may be generated according to the n frames of images by using any one of the following methods:

In the first method, the feature point cloud is generated according to depth information corresponding to each frame of image in the n frames of images, the depth information being used for combining the images to represent the 3D information of the to-be-acquired object.

In some implementations, if the camera of the terminal is a depth camera, that is, when the camera is used to capture a depth image, the image captured by the camera has corresponding depth information. If a software development kit (SDK) of the terminal camera supports the feature point cloud computing function, the feature point cloud can be directly obtained according to the n frames of images.

In the second method, 3D reconstruction is performed on the to-be-acquired object based on the n frames of images to obtain the feature point cloud.

The 3D reconstruction includes a process of establishing a mathematical model of a 3D object that conforms to computer expression and processing. The 3D reconstruction process may include a process of reconstructing 3D information based on single-view or multi-view images, and generating the feature point cloud by using information of a plurality of two-dimensional (2D) images to reconstruct the 3D information according to a relationship between an image coordinate system of the camera and a world coordinate system (WCS).

Step 303: Receive a position input operation, the position input operation being used for determining a display position of the target object in the virtual environment.

In some implementations, if the position input operation is not received, the target object includes an initial position in the virtual environment, and an actual display position of the target object in the virtual environment is obtained by adjusting the initial position. For example, if an initial display position of the target object is (a, b, c) and a relative adjustment distance of an adjustment operation is (x, y, z), a display position of the target object is (a+x, b+y, c+z).

In some implementations, after the display position of the target object in the virtual environment is determined, a display size of the target object in the virtual environment is determined, and the display size is determined by using at least one of the following methods:

In the first method, the display size of the target object is directly determined according to the size of the feature point cloud.

In the second method, the to-be-acquired object is previewed at the display position in the virtual environment, and the display size of the to-be-acquired object in the virtual environment is adjusted through a size adjustment operation, thereby adjusting the display size of the generated target object in the virtual environment.

In the third method, a length of the target object in a target dimension is inputted, and the size of the target object is determined according to a ratio of three dimensions of the to-be-acquired object and the length in the target dimension. For example, assuming the target dimension is the x dimension, the length of the to-be-acquired object is x1, y1, and z1 in x, y, and z dimension, respectively, then a ratio may be y1/x1, or z1/x1. The length of the target object in the target dimension being set according to the quantity of voxel blocks of the target object in the target dimension.

In steps 302 and 303, step 302 may be performed before step 303, or step 303 may be performed before step 302, or step 302 and step 303 may be performed simultaneously. The sequence of performing step 302 and step 303 is not limited in this embodiment.

Step 304: Display the target object at the display position in the virtual environment according to the capture operation and the position input operation, the target object being obtained by filling a region corresponding to the feature point cloud with voxel blocks.

In some implementations, the region corresponding to the feature point cloud may be filled with the voxel blocks by using at least one of the following methods:

In the first method, voxel blocks located on a contour of the region corresponding to the feature point cloud are determined, and the voxel blocks are filled within the contour.

In the second method, the voxel blocks are stacked layer by layer along the region corresponding to the feature point cloud directly, and if a stacked voxel block has no intersection with the pixels in the feature point cloud, the voxel block that has no intersection with the pixels in the feature point cloud is discarded.

Figure 5:
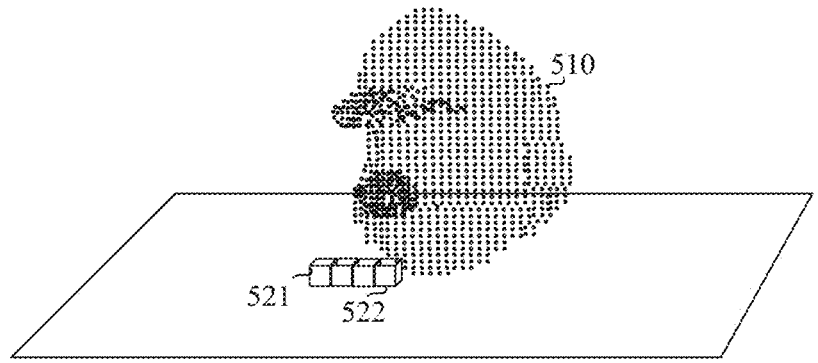
FIG. 5 is a schematic diagram of an interface of a method for filling a voxel region according to an embodiment shown in FIG. 3.

For example, referring to FIG. 5, when the target object corresponding to a feature point cloud 510 is stacked layer by layer, voxel blocks at a bottom layer are stacked first. A voxel block 521 has no intersection with the pixels in the feature point cloud 510, and the voxel block 521 is discarded. A voxel block 522 intersects the pixels in the feature point cloud 510, and the voxel block 522 is retained.

In some implementations, step 304 may be implemented by the terminal, or the terminal may send the n frames of images and the depth information of the images to the server. After the server constructs the target object, a construction result of the target object is sent to the terminal, to be displayed at the display position.

In summary, according to the virtual-environment-based object construction method provided in this embodiment, after the to-be-acquired object is captured by using the camera of the terminal and the 3D information of the to-be-acquired object is acquired, the feature point cloud of the to-be-acquired object is generated according to the 3D information. The target object is generated by filling the voxel blocks in the region corresponding to the feature point cloud in the virtual environment, and the target object is displayed at the display position. This solves the problem that the player cannot accurately control the structure of the voxel blocks during manual construction of the target object and thus fails to construct the object. In addition, the method provided in this embodiment improves the efficiency and the accuracy of the object construction.

Figure 6:
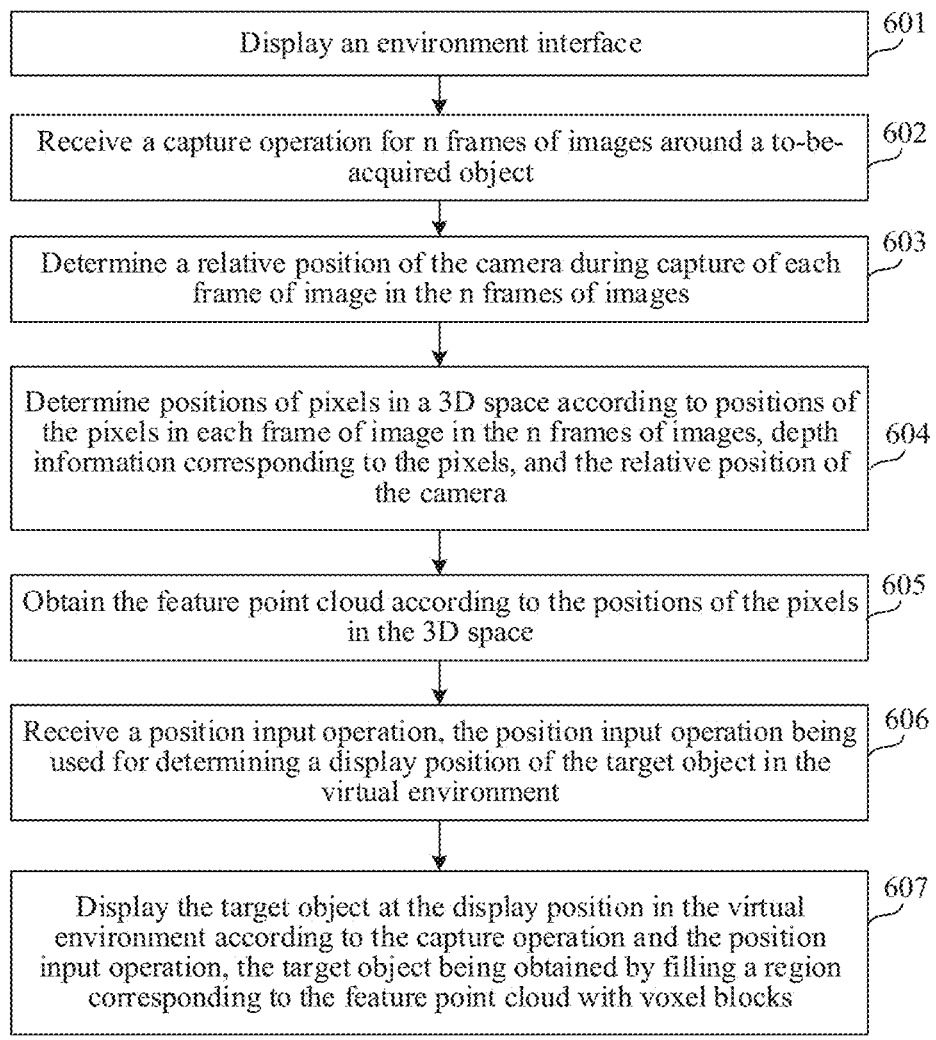
FIG. 6 is a flowchart of a virtual-environment-based object construction method according to another exemplary embodiment of this disclosure.

In one embodiment, in the process of generating the feature point cloud, the feature point cloud needs to be determined according to the depth information and the position of the camera. FIG. 6 is a flowchart of a virtual-environment-based object construction method according to one embodiment of this disclosure. The method being applied to a terminal provided with a camera is used as an example for description. As shown in FIG. 6, the method includes the following steps:

Step 601: Display an environment interface.

The environment interface may include an image corresponding to a virtual environment.

In some implementations, the method is applicable to a sandbox game. The sandbox game provides a virtual environment, and the virtual environment includes a virtual entity. The player can control the virtual entity to move in the virtual environment, construct voxel blocks, or perform other operations. Currently available voxel blocks may also be displayed in the environment interface.

Step 602: Receive a capture operation for n frames of images around a to-be-acquired object.

In some implementations, the specific operation process of the capture operation for the n frames of images is described in detail in step 302, and will not be repeated herein.

Step 603: Determine a relative position of the camera during capture of each frame of image in the n frames of images.

In some implementations, when each frame of image is captured, the relative position of the camera is determined according to a relationship with a position in which the camera captures a key-frame image. That is, the relative position is the position of the camera relative to the position in which the camera captures a key-frame image. The key-frame image may be the first frame of image captured by the camera. When the camera captures the first frame of image, the position of the camera is set or stored, and a position change of the terminal during the capture process is sensed according to an inertial measurement unit (IMU) in the terminal. The relative position of the camera during capture of each frame of image may be obtained according to superposition transformation of IMU position data and feature points correspondence between a current frame of image and the first frame of image. For example, the feature points correspondence indicates a relative position of the feature point in the current frame of image and the first frame of image. The key-frame image may be selected based on a practical use case scenario.

In some implementations, the relative position of the camera may further be determined in combination with data collected by various sensors in the terminal, for example, a gyroscope, a gravity sensor, and the like.

In some implementations, the IMU is an apparatus for measuring a three-axis attitude angle (or an angular rate) and acceleration of the terminal. An IMU may include three single-axis accelerometers and three single-axis gyroscopes. The accelerometer is used for detecting an acceleration signal of an object on each coordinate axis in a 3D Cartesian coordinate system, and then calculate a displacement vector; and the gyroscope is used for detecting a rotation matrix of an object in a 3D Cartesian coordinate system. The IMU may include a gyroscope, an accelerometer, and a geomagnetic sensor.

In some implementations, a process of determining the relative position of the camera during capture of each frame of image according to the IMU includes: the first frame of image acquired by the camera is used as the key-frame image, and the terminal tracks common feature points between a current image and the key-frame image in subsequent image acquisition of the camera. A pose change of the camera in the real world is calculated according to a feature point position change between the current image and the key-frame image, and combined with measurement data of the IMU, the relative position of the camera during capture of the current image is thus determined. For example, the terminal camera captures an object A around the object A to obtain a first image and a second image, where the first image and the second image both include the object A. The terminal determines the first image as a key-frame image and records an initial pose parameter of the camera when the first image is captured, where the initial pose parameter may be acquired by the IMU. Then after the second image is captured, feature point tracking is performed on the second image with respect to the first image, and a pose parameter of the camera during capture of the second image is calculated according to the initial pose parameter and a result of the feature point tracking. Thus, a target pose parameter when the camera captures the second image is determined, that is, the relative position of the camera during capture of the second image.

In some implementations, after the feature point tracking is performed on the second image with respect to the first image, a target feature point in the second image that matches the initial feature point in the first image is obtained. According to the initial feature point and the target feature point, a pose change amount of the camera from an initial pose to a target pose is calculated. The initial pose is a pose when the camera captures the first image, and the target pose is a pose of the camera during capture of the second image. For example, the terminal performs feature point extraction on the first image to obtain N initial feature points, and performs feature point extraction on the second image to obtain M candidate feature points. The M candidate feature points are matched with the N initial feature points to determine at least one matched feature point pair. Each pair of matched feature points includes an initial feature point and a target feature point, where the initial feature point is a feature point in the first image, and the target feature point is a candidate feature point that has the highest matching degree with the initial feature point in the second image. The terminal calculates a homography matrix between the two frames of images according to the initial feature point and the target feature point, decomposes the homography matrix to obtain pose change amounts Rrelocalize and Trelocalize of the camera when the initial pose parameter is changed to the target pose parameter.

The homography matrix describes a mapping relationship between two planes. If feature points in a natural scene (real environment) all fall in the same physical plane, the homography matrix may be used for motion estimation. When there are at least four pairs of matched initial feature points and target feature points, the device decomposes the homography matrix by using a random sample consensus (RANSAC) algorithm to obtain a rotation matrix Rrelocalize and a translation vector Trelocalize.

Rrelocalize is a rotation matrix of the camera when the initial pose parameter is changed to the target pose parameter, and Trelocalize is a translation vector (or displacement vector) of the camera when the initial pose parameter is changed to the target pose parameter.

In some implementations, the feature point tracking process may use a tracking algorithm for visual odometry, or a Kanade-Lucas (KLT) optical flow tracking algorithm. The feature point tracking process may also be performed based on a scale-invariant feature transform (SIFT) feature point descriptor extracted by using the SIFT algorithm or based on an oriented FAST and rotated BRIEF (ORB) feature point descriptor extracted by using the ORB algorithm. The specific algorithm of the feature point tracking is not limited in this application, and the feature point tracking process may adopt a feature point method or a direct method.

Step 604: Determine positions of pixels in a 3D space according to positions of the pixels in each frame of image in the n frames of images, depth information corresponding to the pixels, and the relative position of the camera.

The depth information corresponding to each frame of image may include the depth information corresponding to the pixels in the frame of image. The positions of the pixels in the 3D space can be obtained according to the depth information of the pixels, the positions of the pixels in the image, and the relative position of the camera.

For example, if depth information of a pixel i is d, coordinates of the pixel i in an image k are (a, b), relative position coordinates of the pixel i in the camera coordinate system are (a*d, b*d, d). If a rotation matrix is R and a translation matrix is t when the camera captures the image k, a method for calculating coordinates of the pixel i in a 3D space is as shown in Formula 1:

$$\begin{bmatrix} X_c \\ Y_c \\ Z_c \\ 1 \end{bmatrix} = \begin{bmatrix} R & t \\ 0^T & 1 \end{bmatrix} \begin{bmatrix} X \\ Y \\ Z \\ 1 \end{bmatrix} = L_w \begin{bmatrix} X \\ Y \\ Z \\ 1 \end{bmatrix} \quad \text{Formula 1}$$

where $L_w$ is used for representing rotation and translation of the coordinates of the pixel, X is used for representing the coordinate a*d of the pixel i in the camera coordinate system, Y is used for representing the coordinate b*d of the pixel i in the camera coordinate system, Z is used for representing the coordinate d of the pixel i in the camera coordinate system, and Xc, Yc, and Zc are used for representing the 3D coordinates of the pixel i in the 3D space.

Each pixel may further corresponds to color information. The depth camera may obtain two images in one capture operation. The two images include a color image and a depth image, where the color image includes color information of each pixel, and the depth image includes depth information of each pixel. If the size of the depth image is smaller than the size of the color image, the depth image prevails, and the pixels in the depth image are matched with the pixels in the color image to obtain the color information and the depth information of each pixel.

Step 605: Obtain a feature point cloud according to the positions of the pixels in the 3D space.

The feature point cloud may be obtained according to the position of each pixel in the acquired n frames of images in the 3D space. For a pixel that coincides in the n frames of images, calculation is performed only once, and when the pixel reappears in another image, recalculation for the pixel may be ignored.

Step 606: Receive a position input operation, the position input operation being used for determining a display position of a target object in a virtual environment.

The position input operation may be determined by dragging the feature point cloud in the virtual environment. Alternatively, the target object may be generated for preview after step 605, and the display position of the target object in the virtual environment is determined by dragging the target object in the virtual environment.

In some implementations, in the process of dragging the target object in the virtual environment, the position of the target object may be previewed by highlighting the position of the target object in the virtual environment. For example, the position of the target object is highlighted in black.

Step 607: Display the target object at the display position in the virtual environment according to the capture operation and the position input operation, the target object being obtained by filling a region corresponding to the feature point cloud with voxel blocks.

In some implementations, the voxel blocks for filling the region corresponding to the feature point cloud may be voxel blocks of a uniform color, or the region may be filled with voxel blocks according to a preset color rule, or a color of the voxel blocks for filling the region corresponding to the feature point cloud may be determined according to a color of the to-be-acquired object.

In some implementations, if the color of the voxel blocks is determined according to the color of the to-be-acquired object, the image captured by the camera further includes the color corresponding to each pixel.

In summary, according to the virtual-environment-based object construction method provided in this embodiment, after the to-be-acquired object is captured by using the camera of the terminal and the 3D information of the to-be-acquired object is acquired, the feature point cloud of the to-be-acquired object is generated according to the 3D information. The target object is generated by filling the voxel blocks in the region corresponding to the feature point cloud in the virtual environment, and the target object is displayed at the display position. This solves the problem that the player cannot accurately control the structure of the voxel blocks during manual construction of the target object and thus leads to the object construction failure. In addition, the method provided in this embodiment improves the efficiency and the accuracy of the object construction.

According to the method provided in this embodiment, the image is acquired by the depth camera, the positions of the pixels in the 3D space are determined according to the positions of the pixels in the image, the depth information of the pixels, and the relative position of the camera (e.g., position relative to the position of the camera when taking the key-frame image), and then the feature point cloud is generated. In this case, the efficiency of generating the feature point cloud and the target object is improved.

Figure 7:
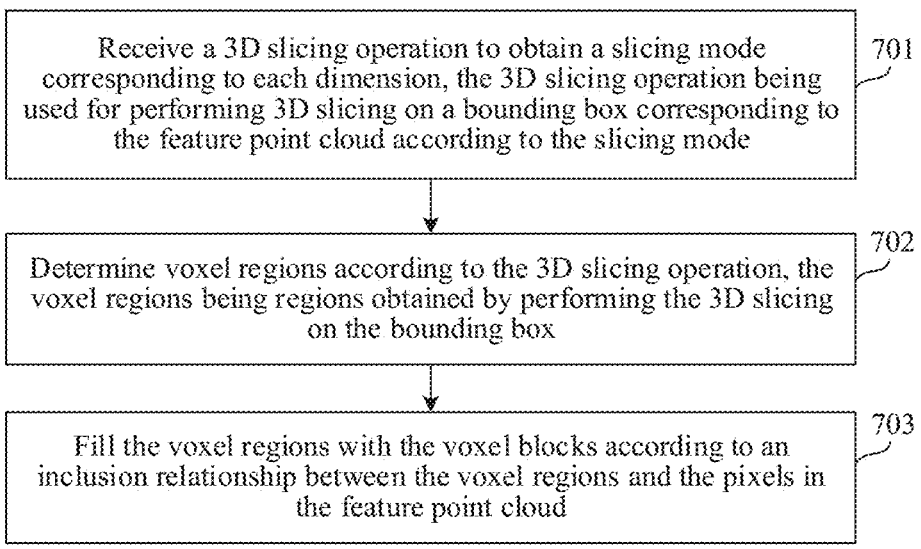
FIG. 7 is a flowchart of a method for filling a region corresponding to the feature point cloud with voxel blocks according to an exemplary embodiment of this disclosure.

In one embodiment, after the feature point cloud is generated, the method for filling a region corresponding to the feature point cloud with voxel blocks is explained. FIG. 7 is a flowchart of a method for filling a region corresponding to the feature point cloud with voxel blocks according to another exemplary embodiment of this disclosure. The method is applied after step 302 shown in FIG. 3, or the method is applied after step 605 shown in FIG. 6. As shown in FIG. 7, the method includes the following steps:

Step 701: Receive a 3D slicing operation to obtain a slicing mode corresponding to each dimension (e.g., the x, y, and z dimension), the 3D slicing operation being used for performing 3D slicing on a bounding box corresponding to the feature point cloud according to the slicing mode.

In some implementations, the bounding box may be the smallest cuboid box surrounding the feature point cloud; or, the bounding box may be a cuboid box corresponding to the feature point cloud and generated according to a 3D size of the feature point cloud.

In some implementations, the slicing mode includes at least one of a slice quantity corresponding to each dimension or a slice size corresponding to each dimension. When the slicing mode is the slice quantity corresponding to each dimension, each dimension is sliced evenly according to the slice quantity.

In some implementations, the 3D slicing means slicing the bounding box in three dimensions according to the slicing mode corresponding to each dimension.

In some implementations, the 3D slicing operation may be performed by using any of the following methods:

In the first method, a slice quantity input operation is received, the slice quantity input operation including an operation of inputting slice quantities of three dimensions of the feature point cloud; and the 3D slicing is performed on the bounding box based on the slice quantities according to the slice quantity input operation.

Figure 8:
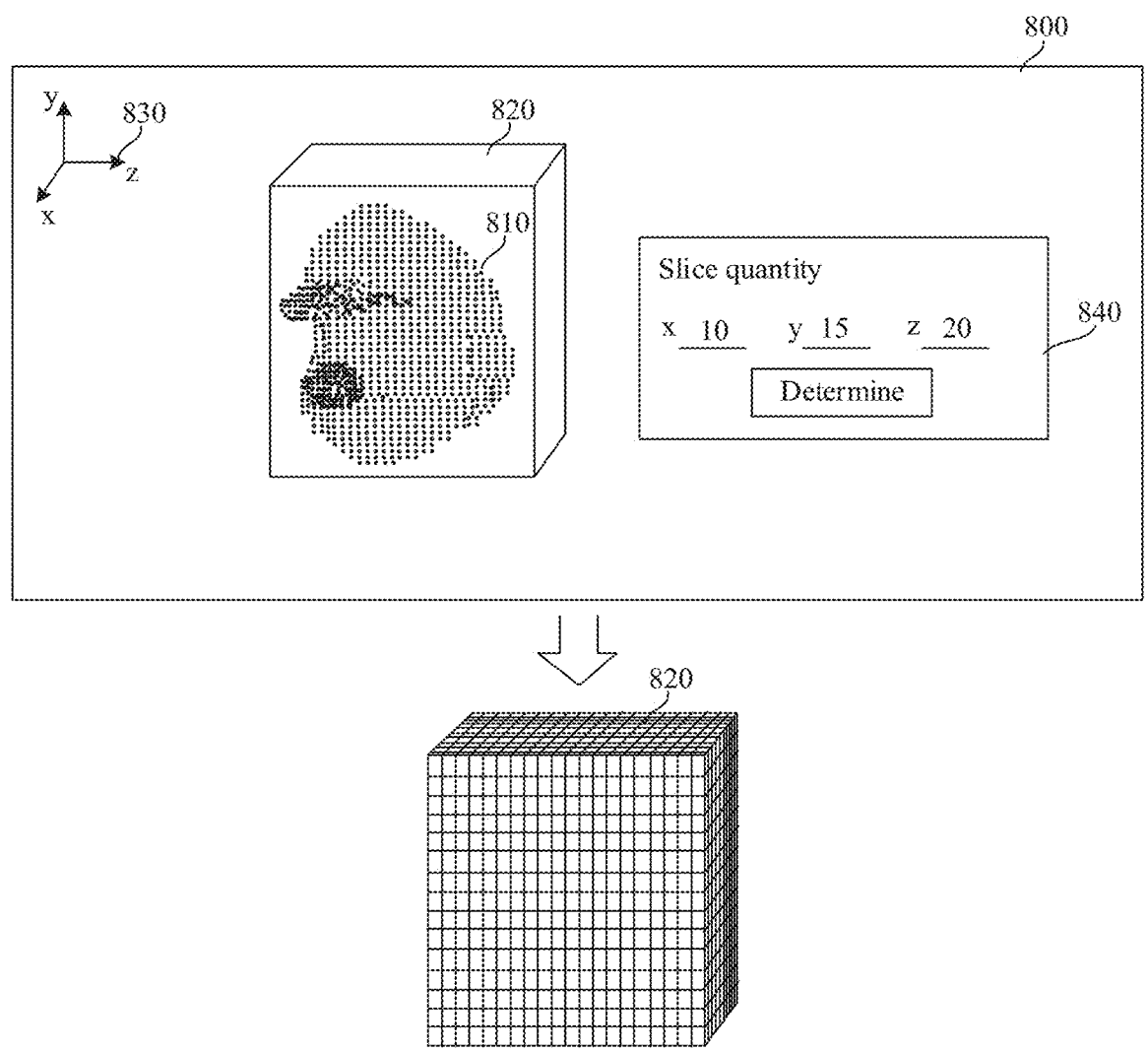
FIG. 8 is a schematic diagram of a method for determining voxel regions according to an embodiment shown in FIG. 7.

For example, referring to FIG. 8, a bounding box 820 corresponding to a feature point cloud 810 is displayed in a virtual environment interface 800. By default, an x-axis direction, a y-axis direction, and a z-axis direction of the 3D directions in the virtual environment are shown as coordinate axes 830. A slice quantity setting operation in a slice quantity input box 840 is received, and a slice quantity setting result is as follows: dividing into 10 parts in the x-axis direction, 15 parts in the y-axis direction, and 20 parts in the z-axis direction. Then the 3D slicing is performed on the bounding box 820 according to the slice quantity setting result, where the bounding box 820 is equally divided into 10 parts in the x-axis direction, 15 parts in the y-axis direction, and 20 parts in the z-axis direction.

In the second method, a sliding slicing operation is received, and the 3D slicing is performed on the bounding box according to the sliding slicing operation.

The slice quantity corresponding to each dimension may be used for determining a degree of refinement of the target object generated based on the feature point cloud. For example, a larger slice quantity indicates a higher degree of refinement of the target object, and the similarity between the target object and the to-be-acquired object is also higher; and a smaller slice quantity indicates a lower degree of refinement of the target object, and the similarity between the target object and the to-be-acquired object is lower. As such, a player may adjust or slide the slice quantity based on a desired degree of refinement of the target object.

Step 702: Determine voxel regions according to the 3D slicing operation, the voxel regions being regions obtained by performing the 3D slicing on the bounding box.

The 3D slicing may be performed on the bounding box, that is, the slicing operation is performed in all three dimensions of the bounding box. Then the voxel regions are obtained according to the slicing operation in the three dimensions, and the voxel regions are regions obtained after the 3D slicing. In some implementations, the voxel regions are to be filled with the voxel blocks.

Step 703: Fill the voxel regions with the voxel blocks according to an inclusion relationship between the voxel regions and the pixels in the feature point cloud.

In some implementations, the voxel region is filled with the voxel blocks if a quantity of the pixels in the voxel region is greater than a preset quantity. In some implementations, the preset quantity may be set and adjusted by the player.

In some implementations, the voxel blocks filled in the voxel region are voxel blocks of a target color, and the target color may be determined by any one of the following methods:

In the first method, a weighted mean color of the pixels in the voxel region is determined to obtain the target color.

In some implementations, the weighted mean color of the pixels is calculated according to RGB values of the pixels. In one implementation, the weight factor may be determined by a player preference.

In the second method, a color with a highest proportion in distribution is determined as the target color according to color distribution of the pixels in the voxel region.

In some implementations, according to the target color, the voxel region is filled with the voxel blocks having a color closest to the target color.

In some implementations, the pixels in the voxel region are traversed, and a first color (the foregoing target color) corresponding to the voxel region is determined. Chromatic aberrations between the first color and colors in a preset color list are calculated to obtain a second color with a smallest chromatic aberration calculation result in the preset color list. The second color is the color of the voxel blocks to be filled in the voxel region. The preset color list may be a list of colors including all colors of the voxel blocks provided in this application. A color with the smallest chromatic aberration from the first color is determined in the preset color list by calculating chromatic aberrations between the first color and the colors in the preset color list. Then the voxel blocks of the determined color are used as the voxel blocks to fill the voxel region.

In some implementations, during calculation of the chromatic aberrations between the first color and the colors in the preset color list, a color distance between two colors may be calculated by a Euclidean distance calculation method. A greater color distance indicates a larger chromatic aberration between the two colors, and two colors with higher similarity corresponds to a smaller color distance. During calculation of the color distance, in an RGB control, a distance between two colors C1 and C2 can be calculated by Formula 2 provided in the following Euclidean distance calculation method, where C1 is the foregoing first color, and C2 is a color in the preset color list:

$$\|C_1 - C_2\| = \sqrt{(C_{1,R} - C_{2,R})^2 + (C_{1,G} - C_{2,G})^2 + (C_{1,B} - C_{2,B})^2}, \quad \text{Formula 2}$$

where $C_{1,R}$ represents a red value of the first color $C_1$, $C_{2,R}$ represents a red value of the color $C_2$, $C_{1,G}$ represents a green value of the first color $C_1$, $C_{2,G}$ represents a green value of the color $C_2$, $C_{1,B}$ represents a blue value of the first color $C_1$, and $C_{2,B}$ represents a blue value of the color $C_2$.

After the RGB values of the first color C1 and the color C2 in the preset color list are substituted into the Formula 2, the chromatic aberration between the first color C1 and the color C2 in the preset color list is obtained.

In some implementations, in addition to the Euclidean distance calculation method, the chromatic aberration calculation method also includes the RGB square method, CIELab chromatic aberration calculation formulas (such as CIELab 76 and CIELab 94), and CIEDE 2000. The method for chromatic aberration calculation is not limited in the embodiments of this disclosure.

In summary, according to the virtual-environment-based object construction method provided in this embodiment, after the to-be-acquired object is captured by using the camera of the terminal and the 3D information of the to-be-acquired object is acquired, the feature point cloud of the to-be-acquired object is generated according to the 3D information. The target object is generated by filling the voxel blocks in the region corresponding to the feature point cloud in the virtual environment, and the target object is displayed at the display position. This solves the problem that the player cannot accurately control the structure of the voxel blocks during manual construction of the target object and thus fails to construct the object. In addition, the method provided in this embodiment improves the efficiency and the accuracy of the object construction.

According to the method provided in this embodiment, the bounding box corresponding to the feature point cloud is sliced to obtain the voxel regions, then the voxel regions are filled with the voxel blocks, and a degree of slicing fineness of the target object is determined by a slicing mode, so that the efficiency and the accuracy of the object construction are improved.

Figure 9:
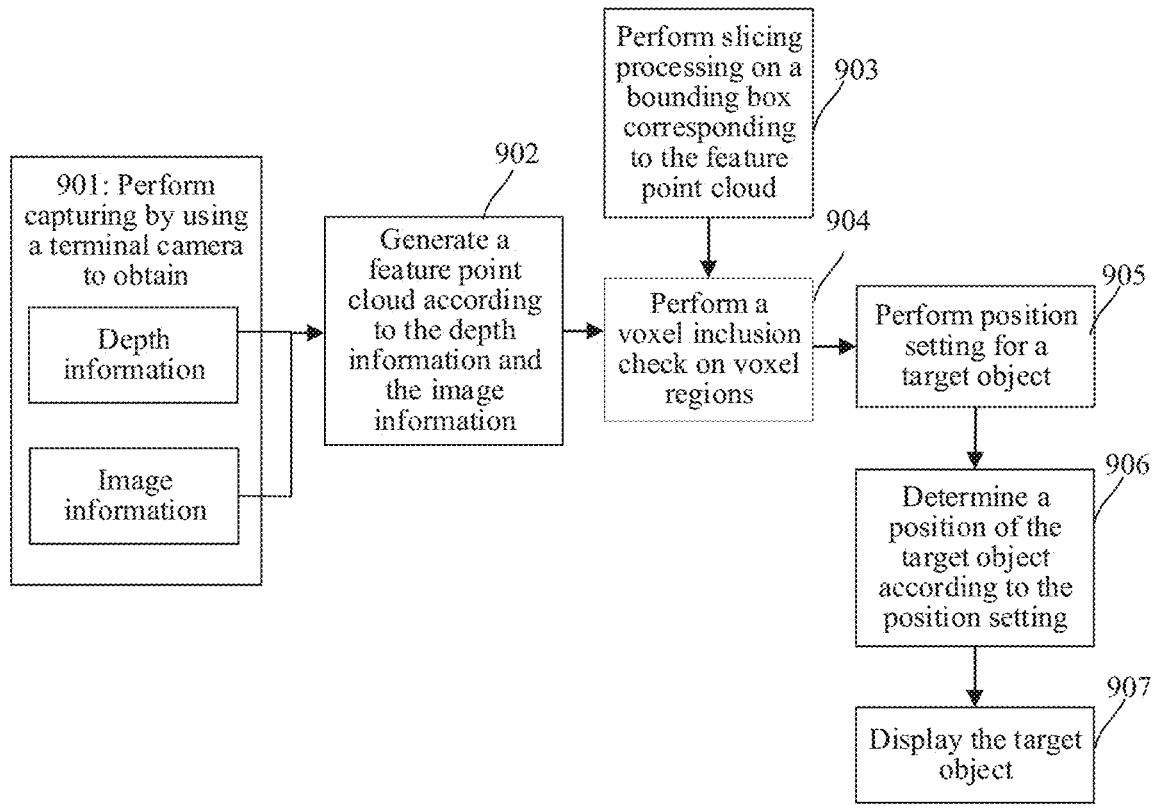
FIG. 9 is a flowchart of a virtual-environment-based object construction method according to another exemplary embodiment of this disclosure.

FIG. 9 is an overall flowchart of a virtual-environment-based object construction method according to an exemplary embodiment of this disclosure. The method being applied to a terminal is used as an example for description. As shown in FIG. 9, the method includes the following steps:

Step 901: Perform capturing by using a terminal camera to obtain depth information and image information.

In some implementations, the terminal camera is a depth camera, and a to-be-acquired object is captured by the camera to obtain the depth information and the image information of the to-be-acquired object. The depth information is used for representing 3D information of the to-be-acquired image, and the image information is used for representing color information of the to-be-acquired image.

Step 902: Generate a feature point cloud according to the depth information and the image information.

A position of each pixel in the image in a 3D space may be determined according to the depth information and the image information, and the feature point cloud is generated according to the position of each pixel. The specific generation method is described in detail in step 604, and will not be repeated herein.

Step 903: Perform slicing processing on a bounding box corresponding to the feature point cloud.

In some implementations, the slicing processing is used for performing 3D slicing on the bounding box corresponding to the feature point cloud to obtain the voxel regions. The slicing mode of the 3D slicing is used for determining a degree of refinement of a to-be-constructed target object, that is, a similarity between the target object and the to-be-acquired object.

Step 904: Perform a voxel inclusion check on voxel regions.

In some implementations, the voxel inclusion check is used for determining whether voxel blocks need to be filled in a voxel region according to the quantity of pixels in the voxel region.

The voxel inclusion check may be further used for determining a color of the voxel blocks in the voxel region.

Step 905: Perform position setting for a target object.

In some implementations, the position setting may be determined by dragging the feature point cloud in the virtual environment. Alternatively, the target object may be generated for preview after the foregoing step, and the display position of the target object in the virtual environment is determined by dragging the target object in the virtual environment.

Step 906: Determine a position of the target object according to the position setting.

Step 907: Display the target object.

In summary, according to the virtual-environment-based object construction method provided in this embodiment, the 3D feature points cloud in the virtual environment and the display position of the target object is selected; then the target object is generated by filling with the voxel blocks within the contour range of the 3D feature points cloud in the virtual environment, and is displayed at the display position. This avoids the problem that the player cannot accurately control the structure of the voxel blocks during manual construction of the target object and thus fails to construct the object. In addition, the method provided in this embodiment improves the efficiency and the accuracy of the object construction.

Although the steps in the flowcharts of FIG. 3, FIG. 6, FIG. 7, and FIG. 9 are displayed in sequence based on indication of arrows, the steps are not necessarily performed in sequence based on the sequence indicated by the arrows. Unless otherwise explicitly specified in this application, execution of the steps is not strictly limited, and the steps may be performed in other sequences. In addition, at least some steps in FIG. 3, FIG. 6, FIG. 7, and FIG. 9 may include a plurality of substeps or a plurality of stages. The substeps or the stages are not necessarily performed at the same moment, but may be performed at different moments. The substeps or the stages are not necessarily performed in sequence, but may be performed in turn or alternately with another step or at least some of substeps or stages of the another step.

Figure 10:
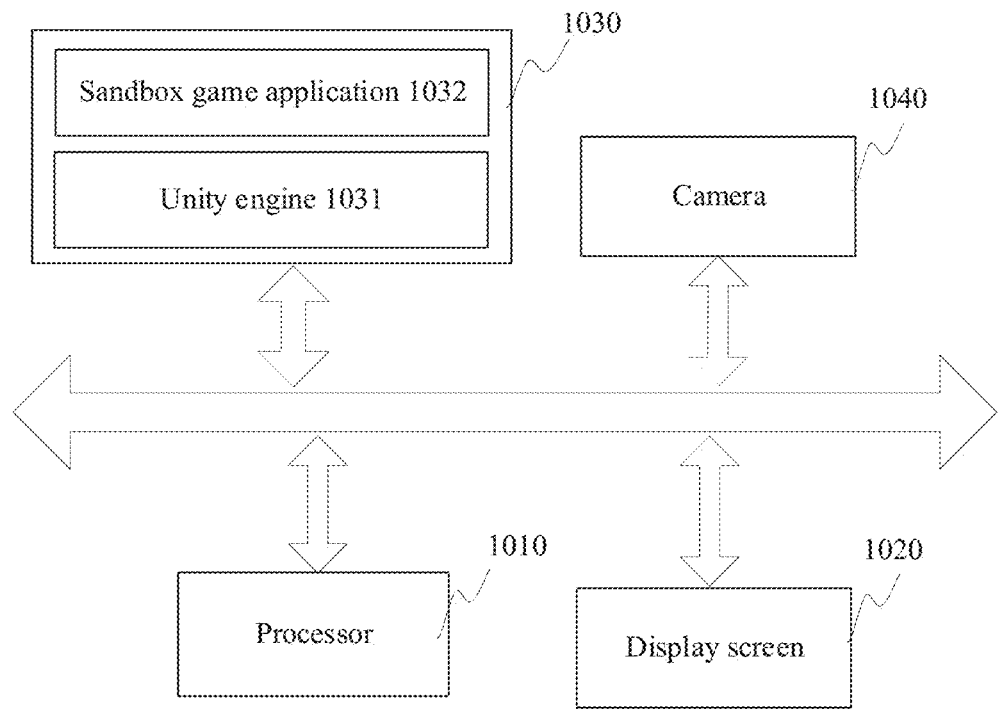
FIG. 10 is a structural block diagram of a terminal according to an exemplary embodiment of this disclosure.

FIG. 10 is a structural block diagram of a terminal according to an exemplary embodiment of this disclosure. As shown in FIG. 10, the terminal includes a processor 1010, a display screen 1020, a memory 1030, and a camera 1040.

The processor 1010 includes a CPU and a GPU. The CPU is mainly responsible for implementing computing tasks of the terminal, and the GPU is mainly responsible for implementing display tasks of the terminal. That is, the GPU is responsible for rendering display content according to data transmitted by the CPU, and displaying the display content on the display screen 1020.

In some implementations, a sandbox game application 1032 developed based on a Unity engine 1031 is installed in the terminal, and a virtual environment is provided in the sandbox game application 1032. In the virtual environment of the sandbox game application 1032, a virtual entity may construct a virtual object through using voxel blocks, and the constructed virtual object is displayed in the virtual environment by using the CPU and GPU. According to the virtual-environment-based object construction method provided in the embodiments of this disclosure, the user may also acquire the depth information and the image information of the to-be-acquired image by using a camera 1040. Then the feature point cloud is generated according to the depth information and the image information to fill the voxel blocks, and the target object corresponding to the to-be-acquired object is displayed in the virtual environment of the sandbox game application 1032.

Figure 11:
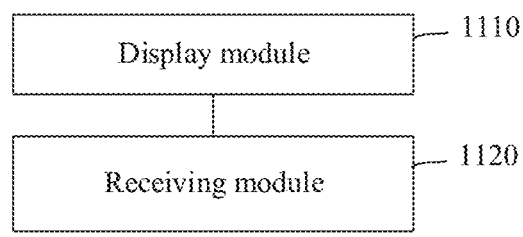
FIG. 11 is a structural block diagram of a virtual-environment-based object construction apparatus according to an exemplary embodiment of this disclosure.

FIG. 11 is a structural block diagram of a virtual-environment-based object construction apparatus according to an exemplary embodiment of this disclosure. The apparatus being applied to a terminal provided with a camera is used as an example for description. As shown in FIG. 11, the apparatus includes a display module 1110 and a receiving module 1120.

The display module 1110 is configured to display an environment interface, the environment interface including an image corresponding to a virtual environment.

The receiving module 1120 is configured to receive a capture operation, the capture operation being used for acquiring 3D information of a to-be-acquired object by using the camera to obtain a feature point cloud of the to-be-acquired object, the feature point cloud being used for determining a style of a to-be-constructed target object.

The receiving module 1120 is further configured to receive a position input operation, the position input operation being used for determining a display position of the target object in the virtual environment.

The display module 1110 is further configured to display the target object at the display position in the virtual environment according to the capture operation and the position input operation, the target object being obtained by filling a region corresponding to the feature point cloud with voxel blocks.

Figure 12:
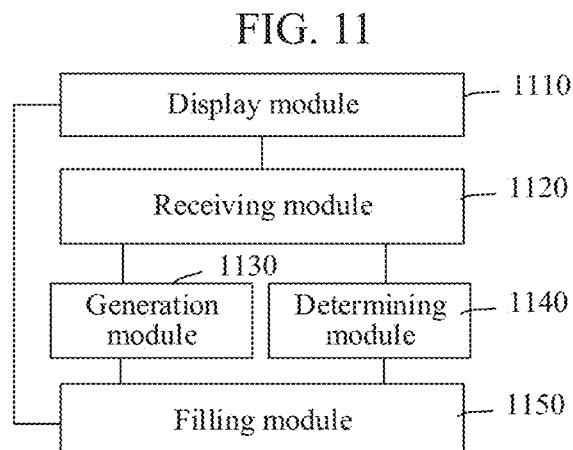
FIG. 12 is a structural block diagram of a virtual-environment-based object construction apparatus according to another exemplary embodiment of this disclosure.

In one embodiment, the receiving module 1120 is further configured to receive the capture operation for n frames of images around the to-be-acquired object, the n frames of images including images captured around the to-be-acquired object, n being a positive integer; and as shown in FIG. 12, the apparatus further includes:

a generation module 1130, configured to generate the feature point cloud according to depth information corresponding to each frame of image in the n frames of images, the depth information being used for combining the images to represent the 3D information of the to-be-acquired object; or perform 3D reconstruction on the to-be-acquired object based on the n frames of images to obtain the feature point cloud.

In one embodiment, the generation module 1130 is further configured to determine a relative position of the camera during capture of each frame of image in the n frames of images, the relative position being determined according to a relationship with a position in which the camera captures a key-frame image;

the generation module 1130 is further configured to determine positions of pixels in a 3D space according to positions of the pixels in each frame of image in the n frames of images, the depth information corresponding to the pixels, and the relative position of the camera; and the generation module 1130 is further configured to obtain the feature point cloud according to the positions of the pixels in the 3D space.

In one embodiment, the receiving module 1120 is further configured to receive a video capture operation around the to-be-acquired object, a video stream captured by the video capture operation including the n frames of images;

or the receiving module 1120 is further configured to receive a fixed-point capture operation around to-be-acquired object, the fixed-point capture operation being used for capturing the n frames of images at designated positions around the to-be-acquired object.

In one embodiment, the receiving module 1120 is further configured to receive a 3D slicing operation to obtain a slicing mode corresponding to each dimension, the 3D slicing operation being used for performing 3D slicing on a bounding box corresponding to the feature point cloud according to the slicing mode; and the apparatus further includes:

a determining module 1140, configured to determine voxel regions according to the 3D slicing operation, the voxel regions being regions obtained by performing the 3D slicing on the bounding box, the voxel regions being used for being filled with the voxel blocks; and a filling module 1150, configured to fill the voxel regions with the voxel blocks according to an inclusion relationship between the voxel regions and the pixels in the feature point cloud.

In one embodiment, the receiving module 1120 is further configured to receive a slice quantity input operation, the slice quantity input operation including an operation of inputting respective slice quantities of three dimensions of the feature point cloud; and perform the 3D slicing on the bounding box based on the slice quantities according to the slice quantity input operation;

or the receiving module 1120 is further configured to receive a sliding slicing operation, and perform the 3D slicing on the bounding box according to the sliding slicing operation, the slice quantity corresponding to each dimension being used for determining a degree of refinement of the target object generated by the feature point cloud.

In one embodiment, the filling module 1150 is further configured to fill the voxel region with the voxel blocks in a case that a quantity of the pixels in the voxel region is greater than a preset quantity.

In one embodiment, the filling module 1150 is further configured to determine a weighted mean color of the pixels in the voxel region to obtain a target color, and fill the voxel region with the voxel blocks having a color closest to the target color. In one implementation, the weight factor may be determined by a player preference;

or the filling module 1150 is further configured to determine a color with a highest proportion in distribution as the target color according to color distribution of the pixels in the voxel regions, and fill the voxel region with the voxel blocks having a color closest to the target color.

In summary, according to the virtual-environment-based object construction apparatus provided in this embodiment, the 3D feature points cloud is generated in the virtual environment and the display position of the target object is selected; then the target object is generated by filling with the voxel blocks within the contour range of 3D feature points cloud in the virtual environment, and is displayed at the display position. This avoids the problem that the player cannot accurately control the structure of the voxel blocks during manual construction of the target object and thus fails to construct the object. In addition, the method provided in this embodiment improves the efficiency and the accuracy of the object construction.

According to the virtual-environment-based object construction apparatus provided in the foregoing embodiments, the foregoing functional modules are only used for exemplary purposes. In actual applications, the functions may be allocated to different functional modules as required, that is, the internal structure of the apparatus is divided to different functional modules to complete all or some of the foregoing functions. In addition, the virtual-environment-based object construction apparatus provided in the foregoing embodiments are based on the same concept as the virtual-environment-based object construction method in the foregoing method embodiments. For the specific implementation process, refer to the method embodiments, and the details are not described herein again.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

Figure 13:
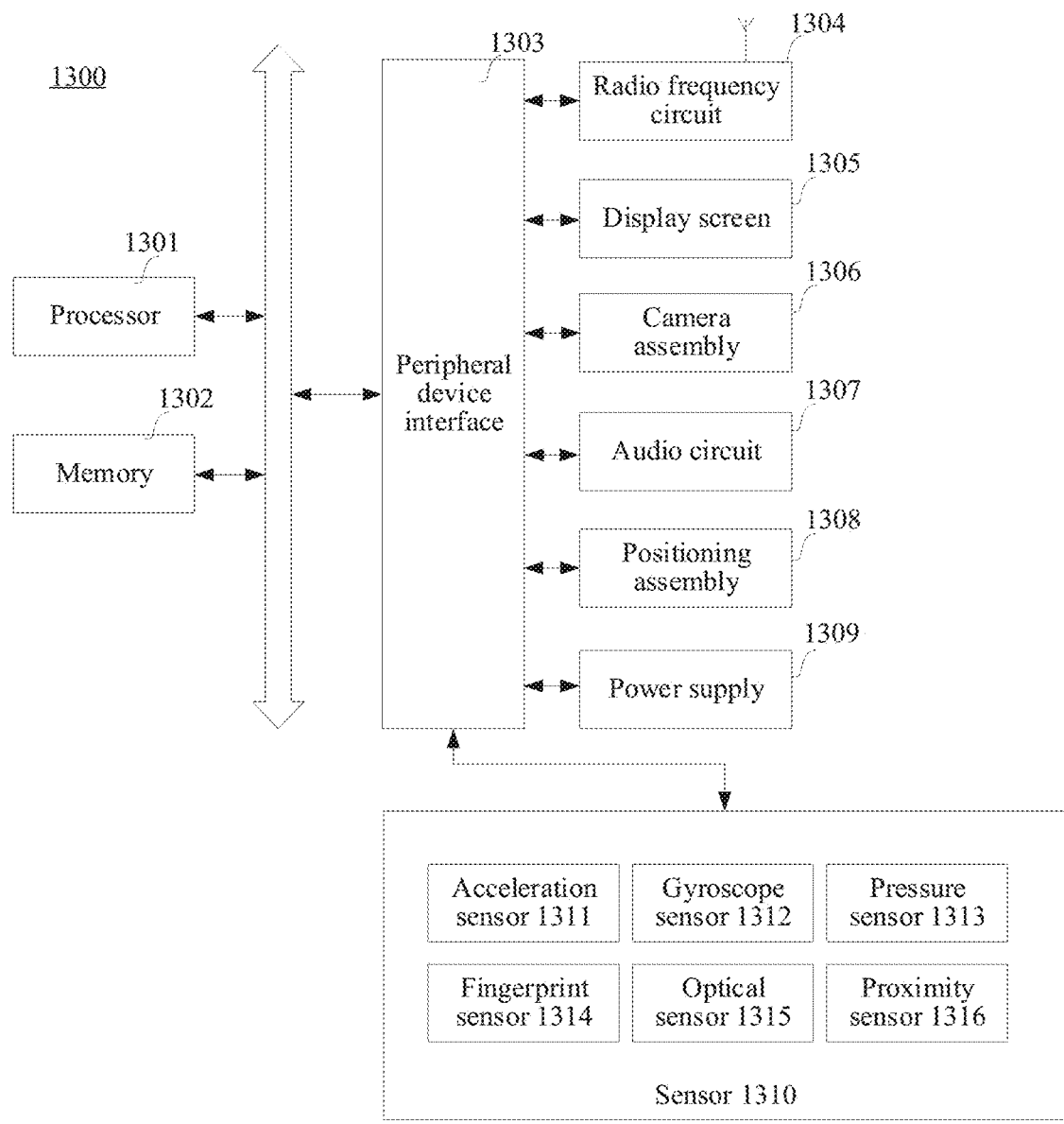
FIG. 13 is a structural block diagram of a terminal according to another exemplary embodiment of this disclosure.

FIG. 13 is a structural block diagram of a terminal 1300 according to an exemplary embodiment of this disclosure. The terminal 1300 may be a smartphone, a tablet computer, a Moving Picture Experts Group Audio Layer III (MP3) player, a Moving Picture Experts Group Audio Layer IV (MP4) player, a notebook computer, or a desktop computer. The terminal 1300 may also be referred to as a user equipment, a portable terminal, a laptop terminal, a desktop terminal or the like.

Generally, the terminal 1300 includes a processor 1301 and a memory 1302.

The processor 1301 may include one or more processing cores, and may be, for example, a 4-core processor or an 8-core processor. The processor 1301 may be implemented in at least one hardware form of digital signal processing (DSP), a field programmable gate array (FPGA), and a programmable logic array (PLA). The processor 1301 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1301 may be integrated with a graphics processing unit (GPU). The GPU is configured to be responsible for rendering and drawing content to be displayed by a display screen. In some embodiments, the processor 1301 may further include an artificial intelligence (AI) processor. The AI processor is configured to process a computing operation related to machine learning.

The memory 1302 may include one or more computer-readable storage media. The computer-readable storage media may be non-transient. The memory 1302 may further include a high-speed random access memory, and a non-volatile memory such as one or more magnetic disk storage devices and a flash memory device. In some embodiments, the non-transient computer-readable storage medium in the memory 1302 is configured to store at least one instruction, and the at least one instruction is used for being executed by the processor 1301 to implement the virtual-environment-based object construction method provided in the method embodiments of this disclosure.

In some embodiments, the terminal 1300 may alternatively include: a peripheral interface 1303 and at least one peripheral. The processor 1301, the memory 1302, and the peripheral interface 1303 may be connected through a bus or a signal cable. Each peripheral may be connected to the peripheral interface 1303 through a bus, a signal cable, or a circuit board. Specifically, the peripheral device includes at least one of a radio frequency (RF) circuit 1304, a touch display screen 1305, a camera 1306, an audio circuit 1307, a positioning assembly 1308, and a power supply 1309.

The peripheral device interface 1303 may be configured to connect the at least one peripheral device related to input/output (I/O) to the processor 1301 and the memory 1302. In some embodiments, the processor 1301, the memory 1302, and the peripheral device interface 1303 are integrated on the same chip or circuit board. In some other embodiments, any one or two of the processor 1301, the memory 1302, and the peripheral device interface 1303 may be implemented on a separate chip or the circuit board. This is not limited in this embodiment.

The RF circuit 1304 is configured to receive and transmit a radio frequency (RF) signal, also referred to as an electromagnetic signal. The RF circuit 1304 communicates with a communication network and other communication devices by using the electromagnetic signal. The RF circuit 1304 converts an electric signal into an electromagnetic signal for transmission, or converts a received electromagnetic signal into an electric signal. The radio frequency circuit 1304 may include an antenna system, an RF transceiver, one or more amplifiers, a tuner, an oscillator, a digital signal processor, a codec chip set, a subscriber identity module card, and the like. The RF circuit 1304 may communicate with other terminals through at least one wireless communication protocol. The wireless communication protocol includes, but is not limited to, a world wide web, a metropolitan area network, an intranet, various generations of mobile communication networks (2G, 3G, 4G, and 5G), a wireless local area network and/or a wireless fidelity (Wi-Fi) network. In some embodiments, the RF circuit 1304 may further include a circuit related to a near field communication (NFC) circuit. This is not limited in this application.

The display screen 1305 is configured to display a user interface (UI). The UI may include a graphic, a text, an icon, a video, and any combination thereof. When the display screen 1305 is a touchscreen, the display screen 1305 is further capable of acquiring a touch signal on or above a surface of the display screen 1305. The touch signal may be inputted into the processor 1301 as a control signal for processing. In this case, the display screen 1305 may be further configured to provide a virtual button and/or a virtual keyboard, also referred to as a soft button and/or a soft keyboard. In some embodiments, there may be one display screen 1305, disposed on a front panel of the terminal 1300. In some other embodiments, there may be at least two display screens 1305, respectively disposed on different surfaces of the terminal 1300 or designed in a foldable shape. In still some other embodiments, the display screen 1305 may be a flexible display screen, disposed on a curved surface or a folded surface of the terminal 1300. Even, the display screen 1305 may be further set to have a non-rectangular irregular graph, that is, a special-shaped screen. The display screen 1305 may be manufactured by using a material such as a liquid crystal display (LCD), an organic light-emitting diode (OLED), or the like.

The camera assembly 1306 is configured to acquire an image or a video. The camera assembly 1306 may include a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera assembly 1306 may further include a flash. The flash may be a monochrome temperature flash, or may be a double color temperature flash. The double color temperature flash refers to a combination of a warm flash and a cold flash, and may be configured to perform light ray compensation at different color temperatures.

The audio circuit 1307 may include a microphone and a speaker. The speaker is configured to acquire sound waves of a user and an environment, and convert the sound waves into electric signals and input the electrical signals into the processor 1301 for processing, or input the electrical signals into the RF circuit 1304 to implement speech communication. For the purpose of stereo sound acquisition or noise reduction, there may be a plurality of microphones, respectively disposed at different parts of the terminal 1300. The microphone may be further a microphone array or an omnidirectional acquisition microphone. The speaker is configured to convert electric signals from the processor 1301 or the RF circuit 1304 into sound waves. The speaker may be a conventional thin-film speaker or a piezoelectric ceramic speaker. When the speaker is the piezoelectric ceramic speaker, the speaker not only converts an electrical signal into sound waves audible to a human being, but also converts an electrical signal into sound waves inaudible to the human being for ranging and other purposes. In some embodiments, the audio circuit 1307 may also include an earphone jack.

The positioning assembly 1308 is configured to position a current geographic location of the terminal 1300, to implement a navigation or a location based service (LBS). The positioning assembly 1308 may be a positioning assembly based on the Global Positioning System (GPS) of the United States, the China's Beidou Navigation Satellite System (BDS), or the Galileo system of Russia.

The power supply 1309 is configured to supply power to assemblies in the terminal 1300. The power supply 1309 may be an alternating current, a direct current, a primary battery, or a rechargeable battery. In a case that the power supply 1309 includes the rechargeable battery, the rechargeable battery may be a wired charging battery or a wireless charging battery. The wired charging battery is a battery charged through a wired line, and the wireless charging battery is a battery charged through a wireless coil. The rechargeable battery may be further configured to support a quick charge technology.

In some embodiments, the terminal 1300 may further include one or more sensors 1310. The one or more sensors 1310 include, but are not limited to: an acceleration sensor 1311, a gyroscope sensor 1312, a pressure sensor 1313, a fingerprint sensor 1314, an optical sensor 1315, and a proximity sensor 1316.

The acceleration sensor 1311 may detect a magnitude of acceleration on three coordinate axes of a coordinate system established with the terminal 1300. For example, the acceleration sensor 1311 may be configured to detect components of gravity acceleration on the three coordinate axes. The processor 1301 may control, according to a gravity acceleration signal acquired by the acceleration sensor 1311, the touch display screen 1305 to display the UI in a landscape view or a portrait view. The acceleration sensor 1311 may be further configured to acquire motion data of a game or a user.

The gyroscope sensor 1312 may detect a body direction and a rotation angle of the terminal 1300. The gyroscope sensor 1312 may cooperate with the acceleration sensor 1311 to acquire a 3D action by the user on the terminal 1300. The processor 1301 may implement the following functions according to data acquired by the gyroscope sensor 1312: motion sensing (for example, the UI is changed according to a tilt operation of a user), image stabilization during shooting, game control, and inertial navigation.

The pressure sensor 1313 may be disposed at a side frame of the terminal 1300 and/or a lower layer of the display screen 1305. When the pressure sensor 1313 is disposed at the side frame of the terminal 1300, a holding signal of the user on the terminal 1300 may be detected. The processor 1301 performs left/right hand recognition or a quick operation according to the holding signal acquired by the pressure sensor 1313. When the pressure sensor 1313 is disposed on the low layer of the touch display screen 1305, the processor 1301 controls, according to a pressure operation of the user on the touch display screen 1305, an operable control on the UI. The operable control includes at least one of a button control, a scroll bar control, an icon control, and a menu control.

The fingerprint sensor 1314 is configured to acquire a fingerprint of a user, and the processor 1301 recognizes an identity of the user according to the fingerprint acquired by the fingerprint sensor 1314, or the fingerprint sensor 1314 recognizes the identity of the user based on the acquired fingerprint. When identifying that the user's identity is a trusted identity, the processor 1301 authorizes the user to perform related sensitive operations. The sensitive operations include: unlocking a screen, viewing encryption information, downloading software, paying and changing a setting, and the like. The fingerprint sensor 1314 may be disposed on a front face, a back face, or a side face of the terminal 1300. When a physical button or a vendor logo is disposed on the terminal 1300, the fingerprint 1314 may be integrated with the physical button or the vendor logo.

The optical sensor 1315 is configured to acquire ambient light intensity. In an embodiment, the processor 1301 may control display brightness of the display screen 1305 according to the ambient light intensity acquired by the optical sensor 1315. Specifically, when the ambient light intensity is relatively high, the display luminance of the display screen 1305 is increased. When the ambient light intensity is relatively low, the display luminance of the display screen 1305 is reduced. In another embodiment, the processor 1301 may further dynamically adjust a camera parameter of the camera assembly 1306 according to the ambient light intensity acquired by the optical sensor 1315.

The proximity sensor 1316, also referred to as a distance sensor, is generally disposed on the front panel of the terminal 1300. The proximity sensor 1316 is configured to acquire a distance between the user and the front surface of the terminal 1300. In an embodiment, when the proximity sensor 1316 detects that the distance between the user and the front surface of the terminal 1300 gradually becomes smaller, the display screen 1305 is controlled by the processor 1301 to switch from a screen-on state to a screen-off state. In a case that the proximity sensor 1316 detects that the distance between the user and the front surface of the terminal 1300 gradually becomes larger, the display screen 1305 is controlled by the processor 1301 to switch from the screen-off state to the screen-on state.

A person skilled in the art may understand that a structure shown in FIG. 13 constitutes no limitation on the terminal 1300, and the terminal may include more or fewer assemblies than those shown in the figure, or some assemblies may be combined, or a different assembly deployment may be used.

A person of ordinary skill in the art may understand that all or some of the steps of the methods in the foregoing embodiments may be implemented by a program instructing relevant hardware. The program may be stored in a computer-readable storage medium. The computer-readable storage medium may be the computer-readable storage medium included in the memory in the foregoing embodiment, or may be a computer-readable storage medium that exists independently and that is not installed in a terminal. The computer-readable storage medium stores at least one instruction, at least one program, and a code set or an instruction set, the at least one instruction, the at least one program, and the code set or the instruction set being loaded and executed by the processor to implement the virtual-environment-based object construction method according to any one of FIG. 3, FIG. 6, and FIG. 7.

According to another aspect, a computer device is provided. The computer device includes a processor and a memory. The memory stores at least one instruction, at least one program, a code set or an instruction set, the at least one instruction, the at least one program, the code set or the instruction set being loaded and executed by the processor to implement the virtual-environment-based object construction method according to any one of FIG. 3, FIG. 6, and FIG. 7.

According to another aspect, a computer-readable storage medium is provided. The computer-readable storage medium stores at least one instruction, at least one program, and a code set or an instruction set, the at least one instruction, the at least one program, and the code set or the instruction set being loaded and executed by the processor to implement the virtual-environment-based object construction method according to any one of FIG. 3, FIG. 6, and FIG. 7.

According to another aspect, a computer program product is provided. The computer program product, when running on a computer, causes the computer to perform the virtual-environment-based object construction method according to any one of FIG. 3, FIG. 6, and FIG. 7.

A person of ordinary skill in the art may understand that all or some of procedures of the method in the foregoing embodiments may be implemented by a computer program instructing relevant hardware. The program may be stored in a non-transitory computer-readable storage medium. When the program is executed, the procedures of the foregoing method embodiments may be implemented. Any reference to a memory, a storage, a database, or another medium used in the embodiments provided in this application can include a non-volatile and/or volatile memory. The non-volatile memory may include a read-only memory (ROM), a programmable ROM (PROM), an electrically programmable ROM (EPROM), an electrically erasable programmable ROM (EEPROM) or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink (Synchlink) DRAM (SLDRAM), a rambus (Rambus) direct RAM (RDRAM), a direct rambus dynamic RAM (DRDRAM), and a rambus dynamic RAM (RDRAM).

Technical features of the foregoing embodiments may be combined in different manners. To make description concise, not all possible combinations of the technical features in the foregoing embodiments are described. However, the combinations of these technical features shall be considered as falling within the scope recorded by this specification provided that no conflict exists. The foregoing embodiments only describe several implementations of this application specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of this application is subject to the protection scope of the appended claims.

What is claimed is:

1. A virtual-environment-based object construction method, performed by a terminal, the method comprising:
    displaying an environment interface, the environment interface comprising an image corresponding to a virtual environment;
    obtaining a feature point cloud from a capture operation performed by a camera, the feature point cloud determining a style of a target object to be displayed;
    receiving a position input operation indicating a display position of the target object in the virtual environment; and
    displaying the target object at the display position in the virtual environment by filling a region corresponding to the feature point cloud with voxel blocks, wherein filling the region corresponding to the feature point cloud with the voxel blocks comprises:
        performing three-dimensional (3D) slicing on a bounding box corresponding to the feature point cloud to obtain voxel regions; and
        filling the voxel regions with the voxel blocks according to an inclusion relationship between the voxel regions and pixels in the feature point cloud by filling the voxel regions with the voxel blocks in response to a quantity of the pixels in the voxel regions being greater than a preset quantity.

2. The method according to claim 1, further comprising:
    receiving the capture operation to capture n frames of images around a to-be-acquired object, and capturing the n frames of images, n being a positive integer; and
    generating the feature point cloud according to depth information corresponding to each of the n frames of images, or performing 3D reconstruction on the to-be-acquired object based on the n frames of images to obtain the feature point cloud.

3. The method according to claim 2, wherein generating the feature point cloud according to the depth information corresponding to the each of the n frames of images comprises:
    determining a relative position of the camera during capturing of the each of the n frames of images, the relative position being determined according to a relationship with a position in which the camera captures a key-frame image;
    determining positions of pixels in a 3D space according to positions of the pixels in the each of the n frames of images, the depth information corresponding to the pixels, and the relative position of the camera; and
    obtaining the feature point cloud according to the positions of the pixels in the 3D space.

4. The method according to claim 2, wherein receiving the capture operation for capturing the n frames of images around the to-be-acquired object comprises one of:
    receiving a video capture operation around the to-be-acquired object, a video stream captured by the video capture operation comprising the n frames of images; or
    receiving a fixed-point capture operation around the to-be-acquired object, the fixed-point capture operation being used for capturing the n frames of images at designated positions around the to-be-acquired object.

5. The method according to claim 1, further comprising:
    receiving a 3D slicing operation to obtain a slicing mode corresponding to each dimension of 3D dimensions, the 3D slicing operation being used to perform the 3D slicing on the bounding box corresponding to the feature point cloud according to the slicing mode.

6. The method according to claim 5, wherein receiving the 3D slicing operation comprises:
    receiving slice quantities from a slice quantity input operation, the slice quantities corresponding to three dimensions of the feature point cloud; and performing the 3D slicing on the bounding box based on the slice quantities; or
    receiving a sliding slicing operation indicating the slice quantities, and performing the 3D slicing on the bounding box according to the slice quantities, the slice quantities corresponding to three dimensions being used to determine a degree of refinement of the target object generated by the feature point cloud.

7. The method according to claim 1, wherein filling the voxel regions with the voxel blocks comprises:
    determining a weighted mean color of the pixels in the voxel regions to obtain a target color, and filling the voxel regions with the voxel blocks having a color closest to the target color.

8. The method according to claim 1, wherein filling the voxel regions with the voxel blocks comprises:
    determining a color with a highest proportion in distribution as a target color according to color distribution of the pixels in the voxel regions, and filling the voxel regions with the voxel blocks having a color closest to the target color.

9. A device for virtual-environment-based object construction, the device comprising:
    a memory storing a plurality of computer instructions; and
    a processor configured to execute the plurality of computer instructions, wherein upon execution of the plurality of computer instructions, the processor is configured to cause the device to:
        display an environment interface, the environment interface comprising an image corresponding to a virtual environment;
        obtain a feature point cloud from a capture operation performed by a camera, the feature point cloud determining a style of a target object to be displayed;
        receive a position input operation indicating a display position of the target object in the virtual environment; and
        display the target object at the display position in the virtual environment by filling a region corresponding to the feature point cloud with voxel blocks, wherein filling the region corresponding to the feature point cloud with the voxel blocks comprises:

performing three-dimensional (3D) slicing on a bounding box corresponding to the feature point cloud to obtain voxel regions; and filling the voxel regions with the voxel blocks according to an inclusion relationship between the voxel regions and pixels in the feature point cloud by filling the voxel regions with the voxel blocks in response to a quantity of the pixels in the voxel regions being greater than a preset quantity.

10. The device according to claim 9, wherein, when the processor, upon execution of the plurality of computer instructions, is further configured to cause the device to:

receive the capture operation to capture n frames of images around a to-be-acquired object, and capture the n frames of images, n being a positive integer; and generate the feature point cloud according to depth information corresponding to each of the n frames of images, or perform 3D reconstruction on the to-be-acquired object based on the n frames of images to obtain the feature point cloud.

11. The device according to claim 10, wherein in order to cause the device to generate the feature point cloud according to the depth information corresponding to the each of the n frames of images, the processor is configured to cause the device to:

determine a relative position of the camera during capturing of the each of the n frames of images, the relative position being determined according to a relationship with a position in which the camera captures a key-frame image;

determine positions of pixels in a 3D space according to positions of the pixels in the each of the n frames of images, the depth information corresponding to the pixels, and the relative position of the camera; and obtain the feature point cloud according to the positions of the pixels in the 3D space.

12. The device according to claim 10, wherein in order to cause the device to receive the capture operation to capture the n frames of images around the to-be-acquired object, the processor is configured to cause the device to:

receive a video capture operation around the to-be-acquired object, a video stream captured by the video capture operation comprising the n frames of images; or receive a fixed-point capture operation around the to-be-acquired object, the fixed-point capture operation being used for capturing the n frames of images at designated positions around the to-be-acquired object.

13. The device according to claim 9, wherein upon execution of the plurality of computer instructions, the processor is further configured to cause the device to:

receive a 3D slicing operation to obtain a slicing mode corresponding to each dimension of 3D dimensions, the 3D slicing operation being used to perform the 3D slicing on the bounding box corresponding to the feature point cloud according to the slicing mode.

14. The device according to claim 13, wherein in order to receive the 3D slicing operation, the processor is configured to cause the device to:

receive slice quantities from a slice quantity input operation, the slice quantities corresponding to three dimensions of the feature point cloud; and perform the 3D slicing on the bounding box based on the slice quantities; or receive a sliding slicing operation indicating the slice quantities, and perform the 3D slicing on the bounding box according to the slice quantities, the slice quantities corresponding to three dimensions being used to determine a degree of refinement of the target object generated by the feature point cloud.

15. The device according to claim 9, wherein in order to cause the device to fill the voxel regions with the voxel blocks, the processor is configured to cause the device to:

determine a weighted mean color of the pixels in the voxel regions to obtain a target color, and fill the voxel regions with the voxel blocks having a color closest to the target color.

16. The device according to claim 9, wherein in order to cause the device to fill the voxel regions with the voxel blocks, the processor is configured to cause the device to:

determine a color with a highest proportion in distribution as a target color according to color distribution of the pixels in the voxel regions, and fill the voxel regions with the voxel blocks having a color closest to the target color.

17. A non-transitory storage medium for storing computer readable instructions, the computer readable instructions, when executed by a processor in a device comprising a camera, causing the processor to:

display an environment interface, the environment interface comprising an image corresponding to a virtual environment;

obtain a feature point cloud from a capture operation performed by a camera, the feature point cloud determining a style of a target object to be displayed;

receive a position input operation indicating a display position of the target object in the virtual environment; and display the target object at the display position in the virtual environment by filling a region corresponding to the feature point cloud with voxel blocks, wherein filling the region corresponding to the feature point cloud with the voxel blocks comprises:

performing three-dimensional (3D) slicing on a bounding box corresponding to the feature point cloud to obtain voxel regions; and filling the voxel regions with the voxel blocks according to an inclusion relationship between the voxel regions and pixels in the feature point cloud by filling the voxel regions with the voxel blocks in response to a quantity of the pixels in the voxel regions being greater than a preset quantity.

18. The non-transitory storage medium according to claim 17, wherein, when the computer readable instructions further cause the processor to:

receive the capture operation for capturing n frames of images around a to-be-acquired object, and capturing the n frames of images, n being a positive integer; and generate the feature point cloud according to depth information corresponding to each of the n frames of images, or perform 3D reconstruction on the to-be-acquired object based on the n frames of images to obtain the feature point cloud.

19. The non-transitory storage medium according to claim 18, wherein in order to cause the processor to generate the feature point cloud according to the depth information corresponding to the each of the n frames of images, the computer readable instructions cause the processor to:

determine a relative position of the camera during capturing of the each of the n frames of images, the relative position being determined according to a relationship with a position in which the camera captures a key-frame image;

determine positions of pixels in a 3D space according to positions of the pixels in the each of the n frames of images, the depth information corresponding to the pixels, and the relative position of the camera; and obtain the feature point cloud according to the positions of the pixels in the 3D space.

20. The non-transitory storage medium according to claim 18, wherein in order to cause the processor to receive the capture operation to capture the n frames of images around the to-be-acquired object, the computer readable instructions cause the processor to:

receive a video capture operation around the to-be-acquired object, a video stream captured by the video capture operation comprising the n frames of images; or receive a fixed-point capture operation around the to-be-acquired object, the fixed-point capture operation being used for capturing the n frames of images at designated positions around the to-be-acquired object.

* * * * *